US009863226B2

(12) United States Patent
Lastra et al.

(10) Patent No.: US 9,863,226 B2
(45) Date of Patent: Jan. 9, 2018

(54) CHEMICAL BASED WELL KICKOFF SYSTEM FOR NATURALLY FLOWING WELLS

(71) Applicant: Saudi Arabian Oil Company, Dhahran (SA)

(72) Inventors: Rafael Lastra, Dhahran (SA); Mohammed Nabil Noui-Mehidi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 629 days.

(21) Appl. No.: 14/499,992

(22) Filed: Sep. 29, 2014

(65) Prior Publication Data

US 2015/0090442 A1    Apr. 2, 2015

Related U.S. Application Data

(60) Provisional application No. 61/884,255, filed on Sep. 30, 2013.

(51) Int. Cl.
*E21B 43/16* (2006.01)
*E21B 27/02* (2006.01)
(Continued)

(52) U.S. Cl.
CPC ............ *E21B 43/168* (2013.01); *C09K 8/594* (2013.01); *E21B 27/02* (2013.01); *E21B 34/00* (2013.01);
(Continued)

(58) Field of Classification Search
CPC ........ E21B 43/168; E21B 27/02; E21B 34/00; E21B 43/122; E21B 47/065; E21B 47/122; E21B 47/06; E21B 43/25; C09K 8/594
See application file for complete search history.

(56) References Cited

U.S. PATENT DOCUMENTS 3,273,643 A   9/1966 Billings et al.
3,746,088 A   7/1973 Haskin et al.
(Continued)

OTHER PUBLICATIONS

PCT Communication Relating to the Results of the Partial International Searching Authority; dated Jan. 5, 2015; International Application No. PCT/US2014/056927; International File Date: Sep. 23, 2014.

*Primary Examiner* — David L Andrews
*Assistant Examiner* — Ronald R Runyan
(74) *Attorney, Agent, or Firm* — Bracewell LLP; Constance Gall Rhebergen

(57) ABSTRACT

A reaction apparatus for providing reactants from a surface to a wellbore to create a generated gas when the reactants undergo a reaction in situ to affect the density of a fluid in the wellbore, the reaction apparatus comprises a reaction housing, the reaction housing comprises a first reactant cell configured to contain a first reactant, a second reactant cell configured to contain a second reactant, a mixing chamber, configured to allow the first reactant and the second reactant to mix, a first passage configured to allow the first reactant to pass from the first reactant cell to the mixing chamber, a second passage configured to allow the second reactant to pass from the second reactant cell to the mixing chamber, an outlet configured to allow the generated gas from the reaction to escape the mixing chamber, a line comprising a plurality of electric cables, and a reel.

16 Claims, 2 Drawing Sheets

(51) Int. Cl.
  *E21B 34/00*   (2006.01)
  *E21B 47/06*   (2012.01)
  *E21B 47/12*   (2012.01)
  *C09K 8/594*   (2006.01)
  *E21B 43/12*   (2006.01)

(52) U.S. Cl.
  CPC .......... *E21B 43/122* (2013.01); *E21B 47/06* (2013.01); *E21B 47/065* (2013.01); *E21B 47/122* (2013.01)

(56) References Cited

U.S. PATENT DOCUMENTS

| | | | |
|---|---|---|---|
| 3,982,591 A * | 9/1976 | Hamrick | ............... E21B 34/16 166/302 |
| 4,051,909 A | 10/1977 | Baum | |
| 4,178,993 A | 12/1979 | Richardson et al. | |
| 5,388,646 A | 2/1995 | Hensley | |
| 6,016,869 A | 1/2000 | Burts, Jr. | |
| 6,367,555 B1 | 4/2002 | Senyard, Sr. et al. | |
| 6,972,274 B1 | 12/2005 | Slikta et al. | |
| 8,047,285 B1 | 11/2011 | Smith | |
| 8,312,924 B2 | 11/2012 | Smith | |
| 8,387,692 B2 | 3/2013 | Tilmont et al. | |
| 2010/0224361 A1 | 9/2010 | Pope et al. | |
| 2013/0029883 A1 | 1/2013 | Dismuke et al. | |
| 2013/0228329 A1 | 9/2013 | Chesky | |

\* cited by examiner

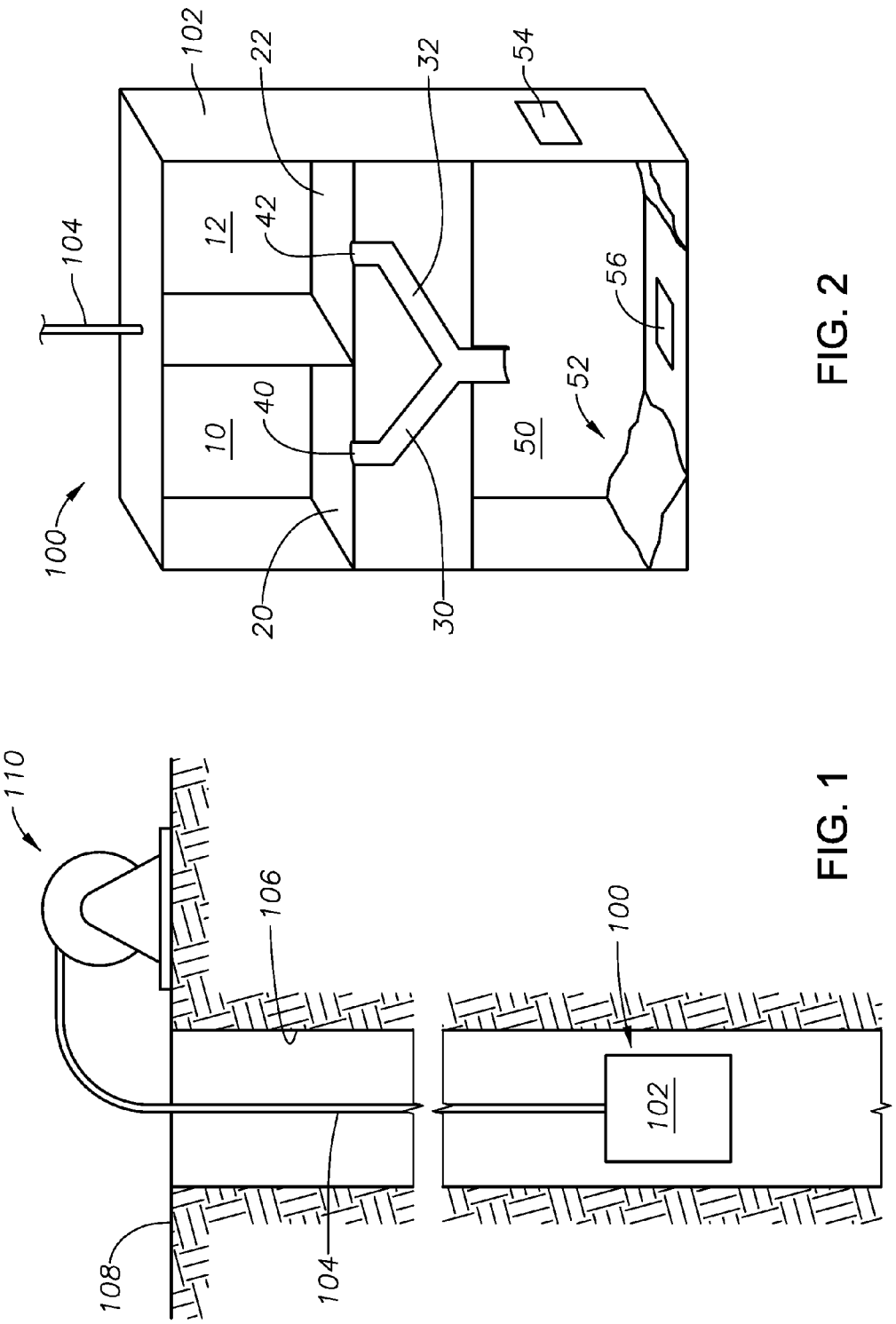

CHEMICAL BASED WELL KICKOFF SYSTEM FOR NATURALLY FLOWING WELLS

BACKGROUND

Field of the Invention

This invention relates to an apparatus and method for reversing well kill operations. More specifically, this invention provides a composition and method to displace killing fluids from a wellbore with naturally flowing oil or gas.

Background of the Invention

At various points in the lifetime of a well, it may be necessary to end the flow of oil, gas, and other reservoir fluids from the reservoir to the wellbore. This kind of operation is commonly referred to as a well kill. Well kills of producing wells typically involve pumping a high density kill fluid into the wellbore. The density of the kill fluid exerts sufficient pressure to prevent fluids from flowing from the reservoir into the wellbore. Kill fluids have the advantage of suppressing well production without the need for continued control from the surface.

Another advantage of using kill fluids to stop production is that such a well kill is reversible. When the well kill involves a heavy mud set in the wellbore, the reversal of the well kill requires the heavy mud to be removed. Typical removal operations involve pumping a gas into the wellbore at a high pressure. The pressure of the gas acts to remove the heavy mud from the wellbore. In some operations, the heavy mud is removed from the wellbore by being forced into the reservoir. This method is cheap, but runs the risk of causing damage to the reservoir. In an alternate method, coiled tubing is inserted into the wellbore. The high pressure gas is inserted through the coiled tubing, circulates out the bottom of the coiled tubing, and lifts the heavy mud up out of the wellbore. The coiled tubing method does not run the same risk to the reservoir, but requires more equipment making it a more expensive reversal option.

A well kill with injected gas is advantageous, because the injection gas is usually a cheap, inert gas such as nitrogen. The injected gases themselves do not prevent the flow of reservoir fluids into the wellbore allowing production to begin promptly upon removal of the kill fluid.

A method with the advantages of injected gas and the minimized risk to the reservoir of coiled tubing and without the operating costs of coiled tubing would be preferred.

SUMMARY OF THE INVENTION

This invention relates to an apparatus and method for reversing well kill operations. More specifically, this invention provides a composition and method to displace killing fluids from a wellbore with naturally flowing oil or gas.

In one aspect of the present invention, a reaction apparatus for providing reactants from a surface to a wellbore to create a generated gas when the reactants undergo a reaction in situ to affect a density of a fluid in the wellbore is provided. The reaction apparatus includes a reaction housing, the reaction housing includes a first reactant cell, the first reactant cell having a passing side and being fully enclosed within the reaction housing, where the first reactant cell is configured to contain a first reactant, a second reactant cell, the second reactant cell having a passing side and being fully enclosed within the reaction housing separate from the first reactant cell, where the second reactant cell is configured to contain a second reactant, a mixing chamber, the mixing chamber being fully enclosed within the reaction housing, being in fluid communication with the passing side of the first reactant cell and the passing side of the second reactant cell, where the mixing chamber is configured to allow the first reactant and the second reactant to mix, a first passage, the first passage in fluid communication with the passing side of the first reactant cell and with the mixing chamber, the first passage configured to allow the first reactant to pass from the first reactant cell to the mixing chamber, a second passage, the second passage in fluid communication with the passing side of the second reactant cell and with the mixing chamber, the second passage configured to allow the second reactant to pass from the second reactant cell to the mixing chamber, and an outlet, the outlet positioned in the mixing chamber, where the outlet is configured to allow the generated gas from the reaction in the mixing chamber to escape the mixing chamber when a reaction pressure in the mixing chamber exceeds a wellbore pressure in the wellbore. The reaction apparatus also includes a line, the line configured to move the reaction housing from the surface to the wellbore, wherein the line contains a plurality of electric cables, each of the plurality of electric cables being configured to transmit a signal to and from the reaction apparatus, and a reel, the reel configured to guide the line into and out of the wellbore.

In certain aspects of the present invention, the reaction apparatus further includes a settling area in the mixing chamber, the settling area configured to collect non-gaseous by-products from the reaction. In certain aspects of the present invention, the settling area includes a dump valve, the dump valve configured to release the non-gaseous by-products into the wellbore, wherein the dump valve is in electrical communication with at least one of the plurality of electric cables. In certain aspects of the present invention, the reaction apparatus further includes a first port in the first passage, the first port configured to allow the first reactant to pass from the first reactant cell to the mixing chamber at a predetermined mark, and a second port in the second passage, the second port configured to allow the second reactant to pass from the second reactant cell to the mixing chamber at the predetermined mark, where the first port and the second port are in electrical communication with at least one of the plurality of electric cables. In certain aspects of the present invention, the first reactant is $NH_4Cl$ and the second reactant is $NaNO_2$ and the generated gas is nitrogen. In certain aspects of the present invention, the reaction apparatus further includes a temperature gauge, the temperature gauge in electrical communication with at least one of the plurality of electric cables, and a pressure gauge, the pressure gauge in electrical communication with at least one of the plurality of electric cables. In certain aspects of the present invention, the reaction apparatus further includes a density gauge mounted externally to the reaction apparatus, the density gauge being in electrical communication with at least one of the plurality of electric cables to transmit the density of the fluid in the wellbore to the surface.

In a second aspect of the present invention, a method for providing reactants that undergo a reaction to produce a generated gas in situ in a wellbore to affect a density of a fluid in the wellbore is provided. The method includes the steps of positioning a reaction housing into the wellbore using a line, the line including a plurality of electric cables, each of the plurality of electric cables being configured to transmit a signal to and from the reaction housing, the reaction housing including a first reactant cell, the first reactant cell containing a first reactant, a second reactant cell, the second reactant cell containing a second reactant, a mixing chamber, the mixing chamber in fluid communication with the first reactant cell through a first passage, the first passage including a first port, the mixing chamber in fluid communication with the second reactant cell through a second passage, the second passage including a second port, and an outlet, the outlet positioned in the mixing chamber. The method further including the steps of opening the first port in the first passage at a predetermined mark to allow the first reactant to pass from the first reactant cell into the mixing chamber, opening the second port in the second passage at the predetermined mark to allow the second reactant to pass from the second reactant cell into the mixing chamber, allowing the first reactant and the second reactant to react in the mixing chamber to generate gas, where the generated gas increases a reaction pressure, increasing the reaction pressure in the mixing chamber until the reaction pressure exceeds a wellbore pressure in the wellbore, and opening the outlet when the reaction pressure exceeds the wellbore pressure, where opening the outlet releases the generated gas into the wellbore such that the generated gas mixes with the fluid in the wellbore and affects the density of the fluid.

In certain aspects of the present invention, the first reactant reacting in the mixing chamber is $NH_4Cl$ and the second reactant reacting in the mixing chamber is $NaNO_2$ and the generated gas is nitrogen. In certain aspects of the present invention, the method further includes the step of accumulating non-gaseous by-products from the reaction in a settling area in the mixing chamber situated below the outlet. In certain aspects of the present invention, the method further includes the step of dumping the non-gaseous byproducts into the wellbore through a dump valve, where the dump valve is in electrical communication with at least one of the plurality of electric cables. In certain aspects of the present invention, the method further includes the steps of measuring a temperature using a temperature gauge, and measuring a pressure using a pressure gauge, where the temperature gauge and the pressure gauge being in electrical communication with at least one of the plurality of electric cables. In certain aspects of the present invention, the method further includes the step of measuring the density of the fluid in the wellbore using a density gauge mounted externally to the reaction housing, the density gauge being in electrical communication with at least one of the plurality of electric cables to transmit the density of the fluid in the wellbore to a surface.

In a third aspect of the present invention, a method for reversing a well kill operation using a kill fluid in a wellbore is provided. The method including the steps of placing a reaction housing into the wellbore using a line, the line including a plurality of electric cables, each of the plurality of electric cables being configured to transmit a signal to and from the reaction housing, the reaction housing including a first reactant cell, the first reactant cell containing a first reactant, a second reactant cell, the second reactant cell containing a second reactant, a mixing chamber, the mixing chamber in fluid communication with the first reactant cell through a first passage, the first passage including a first port, the mixing chamber in fluid communication with the second reactant cell through a second passage, the second passage including a second port, and an outlet, the outlet positioned in the mixing chamber. The method further including the steps of opening the first port in the first passage at a predetermined mark to allow the first reactant to pass from the first reactant cell into the mixing chamber, opening the second port in the second passage at the predetermined mark to allow the second reactant to pass from the second reactant cell into the mixing chamber, allowing the first reactant and the second reactant to react in a reaction in the mixing chamber to produce a generated gas, wherein the generated gas increases a reaction pressure, increasing the reaction pressure in the mixing chamber until the reaction pressure exceeds a wellbore pressure in the wellbore, opening the outlet when the reaction pressure exceeds the wellbore pressure, wherein opening the outlet releases the generated gas into the wellbore, and altering a density of the kill fluid in the wellbore, wherein the density of the kill fluid is altered by mixing with the generated gas, such that the kill fluid rises up from the wellbore.

In certain aspects of the present invention, the first reactant reacting in the mixing chamber is $NH_4Cl$ and the second reactant reacting in the mixing chamber is $NaNO_2$ and the generated gas is nitrogen. In certain aspects of the present invention, the method further includes the step of accumulating non-gaseous byproducts from the reaction in a settling area at the bottom of the mixing chamber situated below the outlet. In certain aspects of the present invention, the method further includes the step of dumping the non-gaseous byproducts into the wellbore through a dump valve, wherein the dump valve is in electrical communication with at least one of the plurality of electric cables. In certain aspects of the present invention, the method further includes the steps of measuring a temperature using a temperature gauge and measuring a pressure using a pressure gauge the temperature gauge and the pressure gauge being in electrical communication with at least one of the plurality of electric cables. In certain aspects of the present invention, the method further includes the step of measuring the density of the fluid in the wellbore using a density gauge mounted externally to the reaction housing, the density gauge being in electrical communication with at least one of the plurality of electric cables to transmit the density of the fluid in the wellbore to a surface.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 1 is a schematic of an embodiment of the present invention.

FIG. 2 is a sectional perspective view of an embodiment of the present invention.

DETAILED DESCRIPTION OF THE INVENTION

Figure 3:
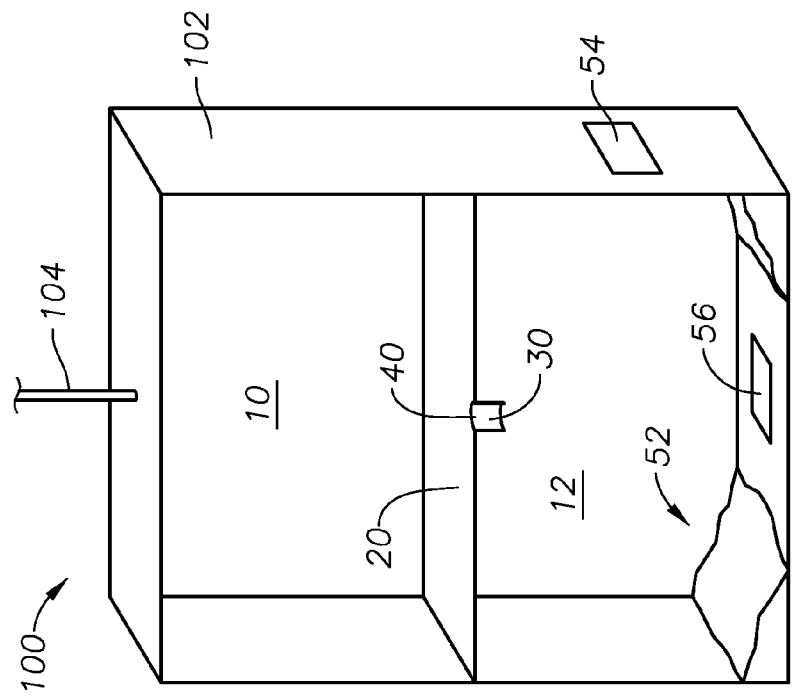
FIG. 3 is a sectional perspective view of an alternate embodiment of the present

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Referring to FIG. 1, a schematic view of an embodiment of reaction apparatus 100 is provided. Reaction housing 102 attached to line 104 is positioned in wellbore 106 using reel 110 stationed on surface 108. Surface 108 is any location from which drilling operations are conducted. Surface 108 can include the earth's surface or a platform surface. Line 104 can be any line, cable, wire, or tubing capable of moving reaction housing 102 from surface 108 into wellbore 106. Line 104 can be single-strand or multistrand. Line 104 can be braided. In some embodiments of the present invention, line 104 is a slickline. In some embodiments of the present invention, line 104 is a wireline.

In at least one embodiment of the present invention, line 104 contains electric cables. The electric cables connect elements of reaction housing 102 to monitoring systems, process control systems, electricity sources, or combinations thereof. The electric cables transmit signals between systems at surface 108 to reaction housing 102.

Wellbore 106 is any wellbore in connection with a reservoir where a kill operation was performed. In at least one embodiment of the present invention, the kill operation was performed as a necessary as part of the overall hydrocarbon production plan.

Reel 110 is any device that stores, transports, spools, and unspools line 104. In some embodiments, reel 110 includes equipment necessary to communicate electronically with reaction housing 102. In some embodiments of the present invention, the electric cables of line 104 connect elements of reaction housing 102 to reel 110.

Reaction housing 102 can be positioned at any point in wellbore 106 in consideration of the configuration of wellbore 106, the reservoir, and the properties of the kill fluid. Reaction housing 102 can be any material that can maintain structural integrity under the temperature and pressure in wellbore 106 and is non-reactive with the kill fluid, the generated gas, and the hydrocarbons in the reservoir. The dimensions of reaction housing 102 are dictated by the internal components, described with reference to FIG. 2 herein and by the diameter (size) of wellbore 106. Dimensions, as used herein includes measurements for size and volume, i.e., length, height, width, depth, thickness, and also shape.

In at least one embodiment of the present invention, reaction housing 102 is connected to coiled tubing, with the coiled tubing connected to a supply source on surface 108.

With reference to FIG. 1 as described above, FIG. 2 provides a cross-sectional perspective view of reaction housing 102 according to one embodiment of the present invention. As provided in FIG. 2, reaction housing 102 includes first reactant cell 10 and second reactant cell 12, the reactant cells. First reactant cell 10 is configured to contain the first reactant. Second reactant cell 12 is configured to contain the second reactant. In at least one embodiment of the present invention, the reactant cells isolate the reactants from each other. In some embodiments of the present invention, first reactant cell 10 and second reactant cell 12 are two separate chambers. In at least one embodiment of the present invention, first reactant cell 10 and second reactant cell 12 are separated by a partial partition (not shown) that does not extend the full height of the reactant cells. First reactant cell 10 is fully enclosed within reaction housing 102. Second reactant cell 12 is fully enclosed within reaction housing 102. The dimensions of first reactant cell 10 and second reactant cell 12 are determined by the quantity or volume of the reactants and by the diameter (size) of wellbore 106. Alternately, the diameter (size) of the production tubing can be used to size reaction housing 102. In one embodiment of the present invention, the reactant cells are sloped to channel the reactants to a place within the reactant cell. The reactant cells are designed to withstand the pressure and temperature of wellbore 106. In some embodiments of the present invention, first reactant cell 10 and second reactant cell 12 are the same in size, shape, and configuration. In at least one embodiment of the present invention, first reactant cell 10 and second reactant cell 12 are different in size, shape, and configuration. In at least one embodiment of the present invention, the exterior of first reactant cell 10 and second reactant cell 12 forms part of reaction housing 102. In at least on embodiment of the present invention, the exteriors of the reactant cells contact the interior of reaction housing 102. The materials of construction for the reactant cells are chosen for compatibility with the reactants.

The first reactant and the second reactant, the reactants, are chosen to react together to generate gas as at least one of the reaction products. The reactants can be salts, acids, or combinations thereof. The generated gases can include nitrogen, hydrogen, carbon dioxide, and combinations thereof. The first reactant and the second reactant can be solid, liquid, gas, or combinations thereof. In at least one embodiment of the present invention, the reactants are solids. The reaction of the present invention can produce non-gaseous by-products.

In accordance with one embodiment of the present invention, the first reactant is ammonium chloride ($NH_4Cl$), the second reactant is sodium nitrite ($NaNO_2$). The reactants react according to the following equation:

$$NH_4Cl + NaNO_2 \rightarrow NaCl + 2H_2O + N_2$$

The generated gas is nitrogen ($N_2$) and the non-gaseous by-products are sodium chloride (NaCl) and water ($H_2O$).

In accordance with one embodiment of the present invention, the first reactant is sodium bicarbonate ($NaHCO_3$), the second reactant is acetic acid ($CH_3CO_2H$). The reactants react according to the following equation:

$$NaHCO_3 + CH_3CO_2H \rightarrow C_2H_3NaO_2 + H_2O + CO_2$$

The generated gas is carbon dioxide ($CO_2$) and the non-gaseous by-products are sodium acetate ($C_2H_3NaO_2$) and water ($H_2O$).

In at least one embodiment, a third reactant is included in mixing chamber 50. In at least one embodiment of the present invention, the third reactant is a catalyst.

Reaction housing 102 further includes first passage 30 and second passage 32. First passage 30 connects passing side 20 of first reactant cell 10 with mixing chamber 50. Second passage 32 connects passing side 22 of second reactant cell 12 with mixing chamber 50. First passage 30 and second passage 32 can be connected to induce contact of the reactants prior to mixing chamber 50, as shown in accordance with FIG. 2. In at least one embodiment of the present invention, first passage 30 and second passage 32 are not connected, such that the reactants pass directly from the reactant cells to mixing chamber 50 without first coming into contact, as shown in accordance with FIG. 3. One of skill in the art will appreciate that the physical dimensions, including the shape and length, and the interconnectedness of first passage 30 and second passage 32 can be configured to accommodate the need for contact prior to mixing chamber 50, the composition of the reactants, or for any reason as desired within the scope of the invention.

First passage 30 is configured to allow the first reactant to pass from first reactant cell 10 to mixing chamber 50. First passage 30 can be in any configuration that allows a material to pass from first reactant cell 10 to mixing chamber 50. Exemplary configurations for first passage 30 include a length of pipe, a length of tubing, or a machined chute. First passage 30 can be at any angle between passing side 20 and mixing chamber 50. The diameter, or width, of first passage 30 can be configured to limit the rate at which the first reactant passes from first reactant cell 10 to mixing chamber 50. In at least one embodiment of the present invention, passing side 20 and first passage 30 are designed such that the first reactant passes from first reactant cell 10 to mixing chamber 50 due to gravity. In at least one embodiment of the present invention, reaction housing 102 is in the absence of first passage 30, such that the first reactant passes directly from passing side 20 to mixing chamber 50.

Second passage 32 is configured to allow the second reactant to pass from second reactant cell 12 to mixing chamber 50. Second passage 32 can be in any configuration that allows a material to pass from second reactant cell 12 to mixing chamber 50. Exemplary configurations for second passage 32 can be a length of pipe, a length of tubing, or a machined chute. Second passage 32 can be at any angle between passing side 22 and mixing chamber 50. The diameter, or width, of second passage 32 can be configured to limit the rate at which the second reactant passes from second reactant cell 12 to mixing chamber 50. In at least one embodiment of the present invention, passing side 22 and second passage 32 are designed such that the second reactant passes from second reactant cell 12 to mixing chamber 50 due to gravity. In at least one embodiment of the present invention, reaction housing 102 is in the absence of second passage 32, such that the second reactant passes directly from passing side 22 to mixing chamber 50.

First passage 30 includes first port 40. First port 40 controls the passage of the first reactant from first reactant cell 10 to mixing chamber 50. First port 40 is configured to allow the passage of the first reactant at the predetermined mark. The predetermined mark can be a physical location within wellbore 106, a measure of time after reaction housing 102 is positioned within wellbore 106, or at a predetermined wellbore pressure in wellbore 106. Exemplary devices for use as first port 40 include valves, nozzles, swing arms, gates, or combinations thereof. First port 40 can be electrically controlled, pneumatically controlled, pressure controlled, or combinations thereof. First port 40 can be manually controlled or can be controlled by a process control loop, wherein the occurrence of one state triggers an action in first port 40. One of skill in the art will appreciate that the design of first port 40 depends on the state of the first reactant and the configuration of first passage 30 and mixing chamber 50. In some embodiments of the present invention, first port 40 is connected to an electric cable which is connected to reel 110 on surface 108.

Second passage 32 includes second port 42. Second port 42 controls the passage of the second reactant from second reactant cell 12 to mixing chamber 50. Second port 42 is configured to allow the passage of the second reactant at the predetermined mark. Second port 42 can be any device that can control the passage of second reactant from second reactant cell 12 to mixing chamber 50. Exemplary devices for use as second port 42 include valves, nozzles, swing arms, or gates. Second port 42 can be electrically controlled, pneumatically controlled, or pressure controlled. Second port 42 can be manually controlled or can be controlled by a process control loop, wherein the occurrence of one state triggers an action in second port 42. One of skill in the art will appreciate that the design of second port 42 depends on the state of the second reactant and the configuration of second passage 32 and mixing chamber 50. In some embodiments of the present invention, second port 42 is connected to an electric cable which is connected to reel 110 on surface 108.

Mixing chamber 50 provides space for the reaction between the first reactant and the second reactant. As the reaction proceeds, the generated gas pressurizes mixing chamber 50 to the reaction pressure. Mixing chamber 50 is designed to maintain structural integrity under the pressure and temperature of wellbore 106. Mixing chamber 50 is designed to maintain structural integrity under the reaction pressure of the generated gas. The materials of construction selected from mixing chamber 50 are chosen to be compatible with the reaction products. The dimensions of mixing chamber 50 are designed to facilitate the reaction between the reactants, to build up the pressure of the generated gas, and to provide a space for the non-gaseous byproducts to accumulate.

Outlet 54 allows the generated gas to escape from mixing chamber 50 into wellbore 106. Mixing chamber 50 includes at least one outlet 54, alternately one outlet 54, alternately two outlets 54, alternately three outlets 54, alternately four outlets 54, alternately more than four outlets 54. Exemplary devices for use as outlet 54 include valves, nozzles, swing arms, and gates. Outlet 54 can be electrically, mechanically, or pneumatically controlled. Outlet 54 can be automatically controlled by a process system or require manual manipulation. In at least one embodiment of the present invention, outlet 54 is a pressure relief valve. In at least one embodiment of the present invention, mixing chamber 50 includes two outlets 54. Outlet 54 can be located in any part of mixing chamber 50, which allows the generated gas to escape into wellbore 106. In accordance with one embodiment of the present invention, outlet 54 is a check valve that can be controlled mechanically or electrically. In an alternate embodiment, outlet 54 is a relief valve rated for the pressure at which the relief valve is to open.

In at least one embodiment of the present invention, mixing chamber 50 includes settling area 52. Settling area 52 collects the non-gaseous by-products from the reaction of the reactants. Settling area 52 can have any configuration that allows for the collection of nongaseous by-products. In at least one embodiment of the present invention, settling area 52 has sloped sides (not shown). Settling area 52 can be configured to hold the non-gaseous by-products or to expel them. In some embodiments of the present invention, settling area 52 is located so that none of non-gaseous by-products are expelled through outlet 54. In at least one embodiment of the present invention, dump valve 56 is located in settling area 52. Dump valve 56 provides the egress for the non-gaseous by-products from mixing chamber 50. Exemplary devices for use as dump valve 56 include valves, swing arms, and gates. Dump valve 56 can be electrically controlled, pneumatically controlled, pressure controlled, or combinations thereof. Dump valve 56 can be manually controlled or can be controlled by a process control loop, wherein the occurrence of one state triggers an action in dump valve 56. In one embodiment of the present invention, dump valve 56 opens to wellbore 106, such that the non-gaseous by-products are expelled into wellbore 106.

Figure 4:
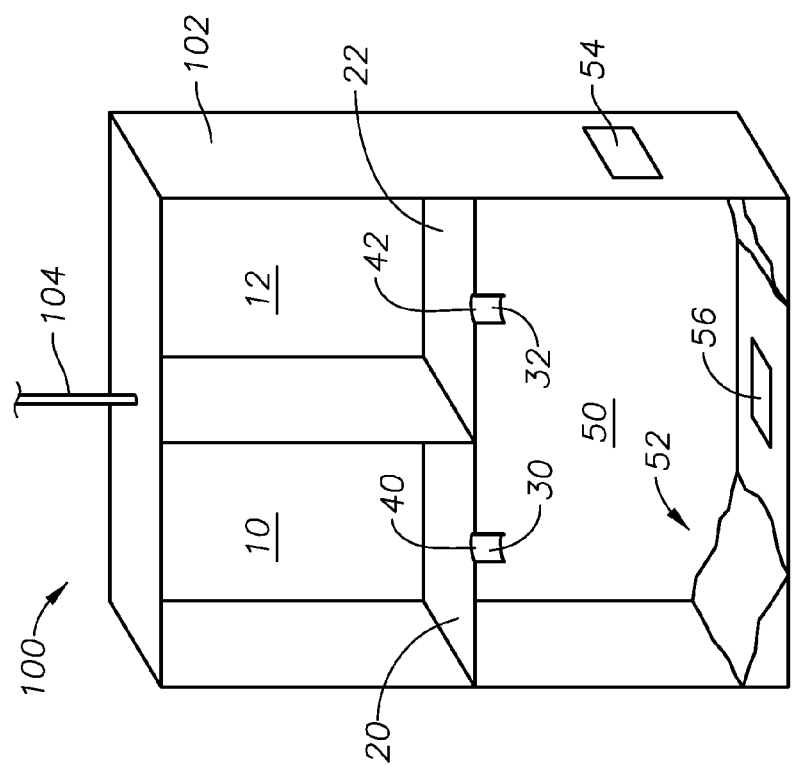
FIG. 4 is a sectional perspective view of an alternate embodiment of the present

It will be appreciated by one skill in the art that other configurations of first reactant cell 10, second reactant cell 12, mixing chamber 50, first passage 30, and second passage 32 can be considered to accommodate the reactants, the reaction, and the reaction products. In at least one embodiment of reaction apparatus 100, as shown with reference to FIG. 4 and with reference to elements described herein, reaction housing 102 contains only first reactant cell 10 and second reactant cell 12. First reactant cell 10 contains the first reactant and second reactant cell 12 contains the second reactant. First passage 30 allows the first reactant to pass from passing side 20 through first port 40 into second reactant cell 12.

Reaction housing 102 includes sensors for pressure, temperature, and density. The sensors are connected to the electric cables in line 104. In one embodiment of the present invention, the electric cables transmit signals from the sensors to reel 110 on surface 108. The signals transmitted through the electric cables can be used in a process control system to control the functions of reaction housing 102 and reaction apparatus 100. In some embodiments of the present invention, reaction housing 102 includes a pressure gauge externally mounted to reaction housing 102. In some embodiments of the present invention, a density gauge is externally mounted to reaction housing 102. In some embodiments of the present invention, a temperature gauge is externally mounted to reaction housing 102. In some embodiments of the present embodiments of the present invention, a pressure gauge is internally mounted in mixing chamber 50. In some embodiments of the present invention, a pressure gauge with an orifice is installed to capture flow rate measurements through outlet 54.

A method is herein provided. In a first step, reaction housing 102 is loaded with the first reactant in first reactant cell 10 and the second reactant in second reactant cell 12. First port 40 and second port 42 are closed to prevent the passage of the first reactant and the second reactant into mixing chamber 50. In at least one embodiment of the present invention, first reactant cell 10 and second reactant cell 12 are pressurized to a pressure commensurate with the pressure of wellbore 106.

Once loaded, reaction housing 102 is positioned within wellbore 106. In accordance with one embodiment of the present invention, line 104 is unspooled from reel 110 to lower reaction housing 102 into wellbore 106. Reaction housing 102 is positioned within wellbore 106 at the predetermined mark. The predetermined mark can be a physical location within wellbore 106, such as a depth from surface 108 or a distance from the terminal point of wellbore 106. The predetermined mark can be a measure of time, such that reaction housing 102 is moved within wellbore 106 until the measure of time is reached. The predetermined mark can be a wellbore pressure within wellbore 106 as measured by a pressure gauge externally mounted to reaction housing 102.

When the predetermined mark is reached, first port 40 in first passage 30 is opened. Opening first port 40 allows the first reactant to enter first passage 30 and pass into mixing chamber 50. Second port 42 in second passage 32 is opened. In one embodiment of the present invention, each port, first port 40 and second port 42, opens upon reaching the predetermined mark. In one embodiment of the present invention, first port 40 opens, then second port 42 opens after first port 40 is opened, but prior to first reactant cell 10 being empty of the first reactant. In an alternate embodiment of the present invention, first port 40 opens, then second port 42 opens after first port 40 closes. In at least one embodiment of the present invention, second port 42 opens before first port 40 opens.

After both first reactant cell 10 and second reactant cell 12 are empty or substantially empty of the reactants, first port 40 and second port 42 close. The first reactant and the second reactant are both in mixing chamber 50. The first reactant and second reactant react in mixing chamber 50 and generate the generated gas. The generated gas increases the reaction pressure in mixing chamber 50.

When the reaction pressure exceeds the wellbore pressure, outlet 54 opens and releases the generated gas into wellbore 106 where the generated gas mixes with the fluid in wellbore 106. In some embodiments, outlet 54 continuously allows the generated gas to escape from mixing chamber 50 into wellbore 106. In some embodiments of the present invention, outlet 54 is designed and controlled to allow intermittent releases of the generated gas from mixing chamber 50. An intermittent release of the generated gas can be based on the reaction pressure in mixing chamber 50, a length of time, or any other factor. The mixing of the generated gas and the fluid decreases the density of the fluid. A decrease in the density of the fluid causes a decrease in the hydrostatic pressure exerted by the fluid in wellbore 106. Once enough generated gas has mixed with the fluid, the density will be decreased enough to lift the fluid from wellbore 106 to surface 108. In at least one embodiment of the present invention, the fluid is the kill fluid.

In at least one embodiment of the present invention, the mixing of the generated gas with the fluid in wellbore 106 reduces the density of the fluid with a negligible effect on the viscosity. In at least one embodiment of the present invention, the generated gas mixes with the fluid in wellbore 106 in the absence of reservoir or formation fluids.

The method described herein can be repeated at the same predetermined mark, or at a second predetermined mark within wellbore 106, until the fluid has been removed from the wellbore 106. In at least one embodiment of the present invention, reaction housing 102 is reloaded.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A reaction apparatus for providing reactants from a surface to a wellbore to create a generated gas when the reactants undergo a reaction in situ to affect a density of a fluid in the wellbore, the reaction apparatus comprising:
a reaction housing, the reaction housing comprising:
a first reactant cell, the first reactant cell having a passing side and being fully enclosed within the reaction housing, wherein the first reactant cell is configured to contain a first reactant;
a second reactant cell, the second reactant cell having a passing side and being fully enclosed within the reaction housing separate from the first reactant cell, wherein the second reactant cell is configured to contain a second reactant;
a mixing chamber, the mixing chamber being fully enclosed within the reaction housing, being in fluid communication with the passing side of the first reactant cell and the passing side of the second reactant cell, wherein the mixing chamber is configured to allow the first reactant and the second reactant to mix;
a settling area in the mixing chamber, the settling area configured to collect non-gaseous by-products from the reaction;
a first passage, the first passage in fluid communication with the passing side of the first reactant cell and with the mixing chamber, the first passage configured to allow the first reactant to pass from the first reactant cell to the mixing chamber;
a second passage, the second passage in fluid communication with the passing side of the second reactant cell and with the mixing chamber, the second passage configured to allow the second reactant to pass from the second reactant cell to the mixing chamber; and
an outlet, the outlet positioned in the mixing chamber, wherein the outlet is configured to allow the generated gas from the reaction in the mixing chamber to escape the mixing chamber when a reaction pressure in the mixing chamber exceeds a wellbore pressure in the wellbore;
a line, the line configured to move the reaction housing from the surface to the wellbore,
wherein the line contains a plurality of electric cables, each of the plurality of electric cables being configured to transmit a signal to and from the reaction apparatus; and
a reel, the reel configured to guide the line into and out of the wellbore.

2. The reaction apparatus of claim 1, wherein the settling area comprises a dump valve, the dump valve configured to release the non-gaseous by-products into the wellbore, wherein the dump valve is in electrical communication with at least one of the plurality of electric cables.

3. The reaction apparatus of claim 1 further comprising:
a first port in the first passage, the first port configured to allow the first reactant to pass from the first reactant cell to the mixing chamber at a predetermined mark; and
a second port in the second passage, the second port configured to allow the second reactant to pass from the second reactant cell to the mixing chamber at the predetermined mark,
wherein the first port and the second port are in electrical communication with at least one of the plurality of electric cables.

4. The reaction apparatus of claim 1, wherein the first reactant is $NH_4Cl$ and the second reactant is $NaNO_2$ and the generated gas is nitrogen.

5. The reaction apparatus of claim 1 further comprising:
a temperature gauge, the temperature gauge in electrical communication with at least one of the plurality of electric cables; and
a pressure gauge, the pressure gauge in electrical communication with at least one of the plurality of electric cables.

6. The reaction apparatus of claim 1 further comprising a density gauge mounted externally to the reaction apparatus, the density gauge being in electrical communication with at least one of the plurality of electric cables to transmit the density of the fluid in the wellbore to the surface.

7. A method for providing reactants that undergo a reaction to produce a generated gas in situ in a wellbore to affect a density of a fluid in the wellbore, the method comprising the steps of:
positioning a reaction housing into the wellbore using a line, the line comprising a plurality of electric cables, each of the plurality of electric cables being configured to transmit a signal to and from the reaction housing, the reaction housing comprising:
a first reactant cell, the first reactant cell containing a first reactant,
a second reactant cell, the second reactant cell containing a second reactant,
a mixing chamber, the mixing chamber in fluid communication with the first reactant cell through a first passage, the first passage comprising a first port, the mixing chamber in fluid communication with the second reactant cell through a second passage, the second passage comprising a second port, and
an outlet, the outlet positioned in the mixing chamber;
opening the first port in the first passage at a predetermined mark to allow the first reactant to pass from the first reactant cell into the mixing chamber;
opening the second port in the second passage at the predetermined mark to allow the second reactant to pass from the second reactant cell into the mixing chamber;
allowing the first reactant and the second reactant to react in the mixing chamber to generate gas, wherein the generated gas increases a reaction pressure;
accumulating non-gaseous by-products from the reaction in a settling area in the mixing chamber situated below the outlet;
increasing the reaction pressure in the mixing chamber until the reaction pressure exceeds a wellbore pressure in the wellbore; and
opening the outlet when the reaction pressure exceeds the wellbore pressure, wherein opening the outlet releases the generated gas into the wellbore such that the generated gas mixes with the fluid in the wellbore and affects the density of the fluid.

8. The method of claim 7, wherein the first reactant reacting in the mixing chamber is $NH_4Cl$ and the second reactant reacting in the mixing chamber is $NaNO_2$ and the generated gas is nitrogen.

9. The method of claim 7, further comprising the step of dumping the non-gaseous byproducts into the wellbore through a dump valve, wherein the dump valve is in electrical communication with at least one of the plurality of electric cables.

10. The method of claim 7, further comprising the steps of:
   measuring a temperature using a temperature gauge; and
   measuring a pressure using a pressure gauge,
   wherein the temperature gauge and the pressure gauge being in electrical communication with at least one of the plurality of electric cables.

11. The method of claim 7, further comprising the step of measuring the density of the fluid in the wellbore using a density gauge mounted externally to the reaction housing, the density gauge being in electrical communication with at least one of the plurality of electric cables to transmit the density of the fluid in the wellbore to a surface.

12. A method for reversing a well kill operation using a kill fluid in a wellbore, the method comprising the steps of:
   placing a reaction housing into the wellbore using a line, the line comprising a plurality of electric cables, each of the plurality of electric cables being configured to transmit a signal to and from the reaction housing, the reaction housing comprising:
      a first reactant cell, the first reactant cell containing a first reactant,
      a second reactant cell, the second reactant cell containing a second reactant,
      a mixing chamber, the mixing chamber in fluid communication with the first reactant cell through a first passage, the first passage comprising a first port, the mixing chamber in fluid communication with the second reactant cell through a second passage, the second passage comprising a second port, and
      an outlet, the outlet positioned in the mixing chamber;
   opening the first port in the first passage at a predetermined mark to allow the first reactant to pass from the first reactant cell into the mixing chamber;
   opening the second port in the second passage at the predetermined mark to allow the second reactant to pass from the second reactant cell into the mixing chamber;
   allowing the first reactant and the second reactant to react in a reaction in the mixing chamber to produce a generated gas, wherein the generated gas increases a reaction pressure;
   accumulating non-gaseous byproducts from the reaction in a settling area at the bottom of the mixing chamber situated below the outlet;
   increasing the reaction pressure in the mixing chamber until the reaction pressure exceeds a wellbore pressure in the wellbore;
   opening the outlet when the reaction pressure exceeds the wellbore pressure, wherein opening the outlet releases the generated gas into the wellbore; and
   altering a density of the kill fluid in the wellbore, wherein the density of the kill fluid is altered by mixing with the generated gas, such that the kill fluid rises up from the wellbore.

13. The method of claim 12, wherein the first reactant reacting in the mixing chamber is $NH_4Cl$ and the second reactant reacting in the mixing chamber is $NaNO_2$ and the generated gas is nitrogen.

14. The method of claim 12, further comprising the step of dumping the non-gaseous byproducts into the wellbore through a dump valve, wherein the dump valve is in electrical communication with at least one of the plurality of electric cables.

15. The method of claim 12, further comprising the steps of measuring a temperature using a temperature gauge and measuring a pressure using a pressure gauge the temperature gauge and the pressure gauge being in electrical communication with at least one of the plurality of electric cables.

16. The method of claim 12, further comprising the step of measuring the density of the fluid in the wellbore using a density gauge mounted externally to the reaction housing, the density gauge being in electrical communication with at least one of the plurality of electric cables to transmit the density of the fluid in the wellbore to a surface.

* * * * *